Feb. 27, 1951     S. PTAK     2,543,300
BASKET COVER
Filed Aug. 15, 1947
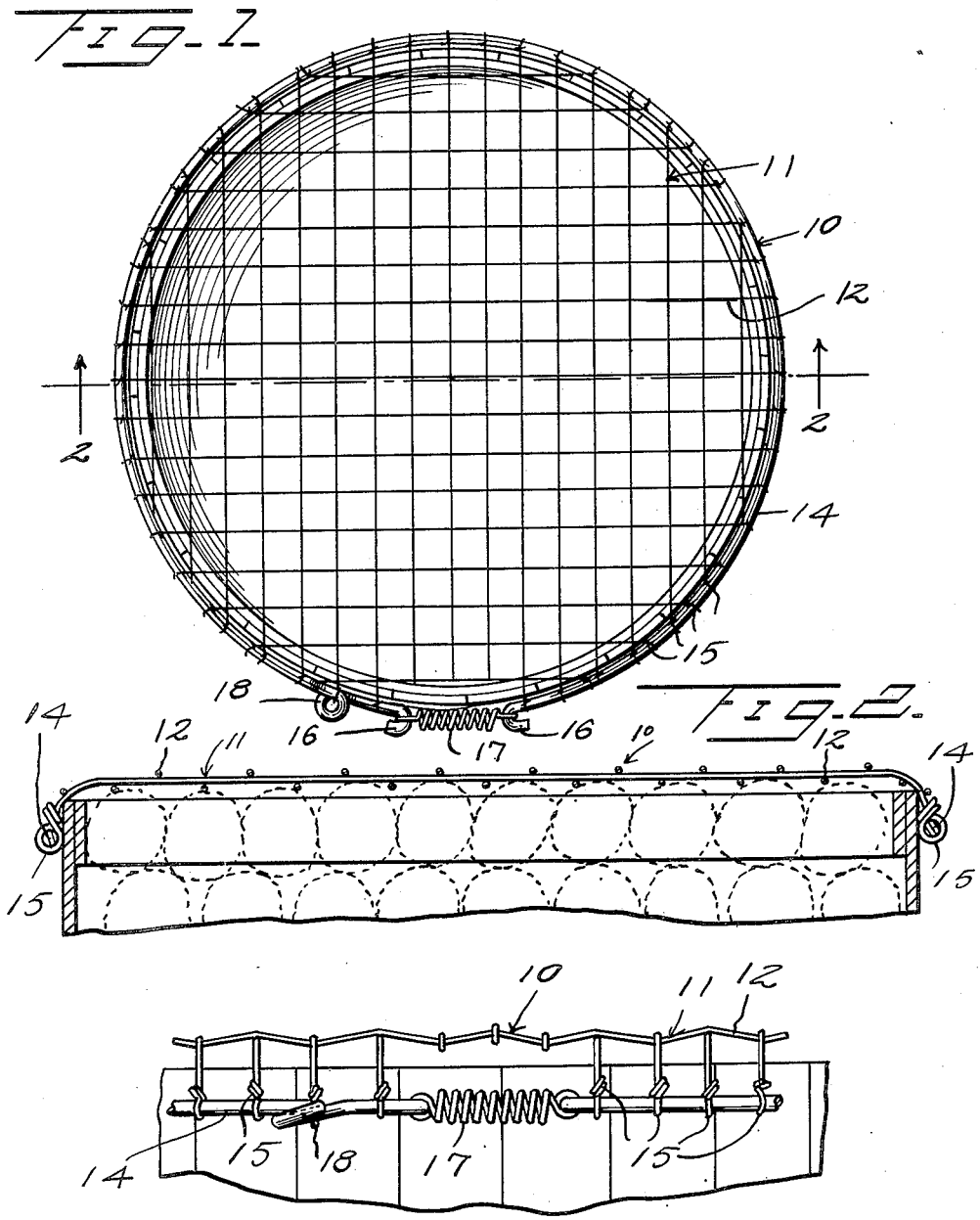
Inventor
Steve Ptak
By Kimmel & Crowell
Attorneys Patented Feb. 27, 1951

2,543,300

UNITED STATES PATENT OFFICE 2,543,300

BASKET COVER

Steve Ptak, Mitchell, S. Dak.

Application August 15, 1947, Serial No. 768,767

1 Claim. (Cl. 217—124)

This invention relates to a basket cover and more particularly to a basket cover for displaying fruit and other food in stores and the like.

It is customary for merchants to display apples and other fruit in open bins and baskets for self-service in their stores. When displaying the goods with the cover removed from the basket, customers constantly help themselves to the particularly arranged food, thus destroying the eye-appeal of the arrangement and rendering that particular basket unmerchantable.

It is an object of this invention to provide a display basket cover for retaining the fruit or other merchandise in the basket while exposing it to view. The display basket cover of this invention is adapted and constructed to replace the basket cover usually provided with the basket.

Another object of this invention is to provide a display basket cover of the kind to be more specifically described hereinafter, having a netted covering fixed to a spring pressed loop engageable about the upper edge of the basket for retaining the cover thereon.

With the above and other objects in view, my invention consists in the arrangement, combination and details of construction disclosed in the drawings and specification, and then more particularly pointed out in the appended claim.

In the drawings:

Figure 1 is a top plan view of a display basket cover constructed according to an embodiment of this invention, Figure 2 is a transverse section taken on the line 2—2 of Figure 1, and Figure 3 is an enlarged fragmentary side elevation showing the connection of the free ends of the looped wire.

Referring to the drawings, the numeral 10 designates generally a display basket cover for replacing the cover normally provided with the baskets of fruit and similar food. When a merchant desires to display his food in the store, it is necessary to remove the original cover from the basket to expose the fruit contained therein. When the food is appealing to the eye, customers frequently remove certain of the fruit from the top of the basket, thus destroying the display and rendering that particular basket less desirable to other prospective customers.

By providing a cover of this kind, the food is suitably retained in the basket and there is less possibility of patrons removing certain ones of the fruit therefrom.

The basket cover 10 is formed with a netted cover 11 which is formed of interconnected cords 12 disposed in close relation to each other to form a wide mesh net.

The net 11 is adapted to be secured over the open end of the basket by a split ring 14. The cover 11 is annular in plan view as shown in Figure 1 for covering round baskets and may be varied in shape for any other particular shaped basket.

The terminal ends of each of the cords 12 are formed with loops 15 through which the wire loop 14 is engageable. The wired loop 14 is formed of an elongated length of wire of a contour to suit the periphery of the upper edge of a basket. The free terminal ends of the wire 14 are reverted in opposite directions as indicated in Figure 1 to form hooks 16 thereof.

The oppositely disposed hooks 16 are normally spaced apart and they are urged together in clamping fashion by a spring 17 loosely connected therebetween. The spring 17 urges the hooks together for clamping the ring 14 about the basket.

As the hooks 16 will normally lie close to the plane of the sides of the basket, it would be difficult to press the hooks together for removing or inserting the spring 17 in the hooks.

In order to facilitate the impression of the split ring 14 for attaching or removing the spring 17, there is provided a looped hook 18 adjacent one end of the wire 14. The loop or handle 18 is formed by coiling the wire 14 about itself adjacent one end thereof and spaced from the adjacent hook 16.

While the cover 11 is formed as shown in the drawings with cords knotted or looped together, it is understood that the cover may be formed of a plastic or wire or other suitable material for retaining the goods in the basket while permitting them to be viewed from without.

I do not mean to confine myself to the exact details of construction herein disclosed but claim all variations falling within the purview of the appended claim.

Having thus described my invention, what I claim is:

A display basket cover comprising an annular net cover member formed of interconnected cords, loops on the peripherally disposed terminal ends of said cords, a split resilient wire attaching ring engaging said cover through the loops of said cords, spaced apart reverted hooks formed on the ends of said ring, a coil spring having loops at its ends, said loops being engageable and disengageable over said hooks and an integral loop in said wire ring adjacent one of said hooks forming a handle for biasing the ends of said ring together to permit engagement and disengagement of said spring.

STEVE PTAK.

REFERENCES CITED

The following references are of record in the file of this patent:

UNITED STATES PATENTS

| Number | Name | Date |
|---|---|---|
| 355,925 | Gary | Jan. 11, 1887 |
| 740,390 | Bronson | Oct. 6, 1903 |
| 1,158,915 | Gibbs | Nov. 2, 1915 |
| 1,740,957 | Phillips | Dec. 24, 1929 |
| 1,933,862 | Leatherdale et al. | Nov. 7, 1933 |

FOREIGN PATENTS

| Number | Country | Date |
|---|---|---|
| 70,221 | Switzerland | Apr. 8, 1915 |